(12) United States Patent
Yoda et al.

(10) Patent No.: US 8,479,277 B2
(45) Date of Patent: Jul. 2, 2013

(54) INFORMATION PROCESSING APPARATUS, INFORMATION PROCESSING SYSTEM, AND COMPUTER READABLE MEDIUM

(75) Inventors: Yoshiyuki Yoda, Saitama (JP); Masaki Kurokawa, Saitama (JP); Eiji Shimoichi, Saitama (JP); Yuriko Inakawa, Saitama (JP); Eiji Nishi, Saitama (JP); Noriyuki Tatsuma, Saitama (JP); Akira Okamoto, Saitama (JP); Takanari Ishimura, Saitama (JP); Akihide Oshima, Saitama (JP); Atsuhiro Itoh, Saitama (JP); Fumio Harada, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1131 days.

(21) Appl. No.: 12/056,426

(22) Filed: Mar. 27, 2008

(65) Prior Publication Data
US 2009/0077650 A1  Mar. 19, 2009

(30) Foreign Application Priority Data

Sep. 18, 2007  (JP) .................................. 2007-241023

(51) Int. Cl.
*H04L 29/06*  (2006.01)
(52) U.S. Cl.
USPC ................ 726/14; 713/154; 713/166; 726/27
(58) Field of Classification Search
USPC ................................ 726/14, 27; 713/154, 166
See application file for complete search history.

(56) References Cited

U.S. PATENT DOCUMENTS

| | | | |
|---|---|---|---|
| 6,477,648 B1 * | 11/2002 | Schell et al. | 726/22 |
| 6,816,966 B1 * | 11/2004 | Gupta et al. | 713/163 |
| 7,984,294 B1 * | 7/2011 | Goringe et al. | 713/166 |
| 8,250,360 B2 * | 8/2012 | Winig | 713/154 |
| 2002/0178246 A1 * | 11/2002 | Mayer | 709/223 |
| 2003/0065952 A1 * | 4/2003 | Otsuka | 713/201 |
| 2004/0111391 A1 * | 6/2004 | Fujita et al. | 707/1 |
| 2004/0117389 A1 * | 6/2004 | Enami et al. | 707/100 |
| 2004/0250129 A1 * | 12/2004 | Clough et al. | 713/201 |
| 2005/0060407 A1 * | 3/2005 | Nagai | 709/225 |
| 2006/0036707 A1 * | 2/2006 | Singh et al. | 709/217 |
| 2006/0072454 A1 * | 4/2006 | Ain et al. | 370/230 |
| 2006/0129602 A1 * | 6/2006 | Witriol et al. | 707/104.1 |
| 2006/0156391 A1 * | 7/2006 | Salowey | 726/5 |
| 2007/0157307 A1 * | 7/2007 | Katoh et al. | 726/14 |
| 2007/0214499 A1 * | 9/2007 | Clymer et al. | 726/4 |
| 2007/0297405 A1 * | 12/2007 | He | 370/389 |
| 2008/0022389 A1 * | 1/2008 | Calcev et al. | 726/14 |
| 2008/0028436 A1 * | 1/2008 | Hannel et al. | 726/1 |

FOREIGN PATENT DOCUMENTS

| | | |
|---|---|---|
| JP | 11-353258 A | 12/1999 |
| JP | 2000-276443 A | 10/2000 |
| JP | 2000-312226 A | 11/2000 |
| JP | 2001-243195 A | 9/2001 |

(Continued)

OTHER PUBLICATIONS

Office Communication Dated Jan. 8, 2010 issued by the Japanese Patent Office in counterpart application No. 2007-241023.

*Primary Examiner* — Michael Pyzocha
(74) *Attorney, Agent, or Firm* — Sughrue Mion, PLLC

(57) ABSTRACT

An information processing apparatus includes: a connecting section; an information storage; a request accepting section; a searching section; a setting information storage; a determining section; and a process executing section.

16 Claims, 19 Drawing Sheets

FOREIGN PATENT DOCUMENTS

| | | |
|---|---|---|
| JP | 2003-345663 A | 12/2003 |
| JP | 2004-234241 A | 8/2004 |
| JP | 2005-148952 A | 6/2005 |
| JP | 2006-107373 A | 4/2006 |
| JP | 2006-157470 A | 6/2006 |
| JP | 2006-313431 A | 11/2006 |
| JP | 2007-072516 A | 3/2007 |
| JP | 2007-140958 A | 6/2007 |

* cited by examiner

FIG. 3

CONFIGURATION EXAMPLE OF PATH DATABASE

| CONTENT URL | ALLOWED ROUTER | NON-ALLOWED ROUTER | OPERATION AT NON-ALLOWANCE | CRITERION FOR DETERMINING ALLOWANCE |
|---|---|---|---|---|
| /a. html | 192. 168. 1. 254 | | NO REPLY | NON-ALLOWED OTHER THAN ALLOWED ROUTER |
| /b. html | abc. def. com | | NON-ALLOWANCE REPLY | ALLOWED WHEN REQUEST PASSES ALLOWED ROUTER |
| /c. html | | 192. 168. 2. 254 | NO REPLY | |
| /d. html | | cde. def. com | NON-ALLOWANCE REPLY | |
| /e. html | 192. 168. 1. 254 or abc. def. com | | NO REPLY | NON-ALLOWED OTHER THAN ALLOWED ROUTER |
| /f. html | | 192. 168. 2. 254 or cde. def. com | NON-ALLOWANCE REPLY | |
| /g. html | 192. 168. 1. 254 or abc. def. com | 192. 168. 2. 254 or cde. def. com | NO REPLY | ALLOWED WHEN REQUEST PASSES ALLOWED ROUTER |
| OTHER THAN ABOVE | 192. 168. 1. 254 or abc. def. com or bca. def. com | 192. 168. 2. 254 or cde. def. com or dec. def. com | NON-ALLOWANCE REPLY | NON-ALLOWED OTHER THAN ALLOWED ROUTER |

Columns: A1, A2, A3, A4, A5

FIG. 6

| GROUP | CONTENT URL |
|---|---|
| A | /a. html |
| B | /b. html |
|   | /c. html |
| C | /d. html |
|   | /e. html |
|   | /f. html |
|   | /g. html |
| D | OTHER THAN ABOVE |

FIG. 7

CONTENTS OF PATH DATABASE

| GROUP | ALLOWED ROUTER | NON-ALLOWED ROUTER | OPERATION AT NON-ALLOWANCE | CRITERION FOR DETERMINING ALLOWANCE |
|---|---|---|---|---|
| A | 192. 168. 1. 254 | | NO REPLY | NON-ALLOWED OTHER THAN ALLOWED ROUTER |
| B | abc. def. com | | NON-ALLOWANCE REPLY | ALLOWED WHEN REQUEST PASSES ALLOWED ROUTER |
| C | | 192. 168. 2. 254 | NO REPLY | |
| D | | cde. def. com | NON-ALLOWANCE REPLY | |

FIG. 8

CONTENTS OF PATH DATABASE

| SAFETY LEVEL | ALLOWED ROUTER | NON-ALLOWED ROUTER | OPERATION AT NON-ALLOWANCE | CRITERION FOR DETERMINING ALLOWANCE |
|---|---|---|---|---|
| 1 | 192.168.1.254 | | NO REPLY | NON-ALLOWED OTHER THAN ALLOWED ROUTER |
| 2 | abc.def.com | | NON-ALLOWANCE REPLY | ALLOWED WHEN REQUEST PASSES ALLOWED ROUTER |
| 3 | | 192.168.2.254 | NO REPLY | |
| 4 | | cde.def.com | NON-ALLOWANCE REPLY | |

FIG. 9

CONTENTS OF PUBLIC REFERENCE LEVEL DATABASE

| CONTENT URL | PUBLIC REFERENCE LEVEL |
|---|---|
| /a. html | 1 |
| /b. html | 1 |
| /c. html | 2 |
| /d. html | 2 |
| /e. html | 3 |
| /f. html | 3 |
| /g. html | 3 |
| OTHER THAN ABOVE | 4 |

FIG. 13

PATH DATABASE MOUNTED IN FIREWALL

| SERVER | ALLOWED/NON-ALLOWED ROUTER OR ALLOWED/NON-ALLOWED AREA (A11) | PUBLIC/NON-PUBLIC CONTENTS (A12) |
|---|---|---|
| www. fxpsc. co. jp<br>w3. fxpsc. co. jp | DETERMINE DEPENDING ON SERVER-SIDE INFORMATION | DETERMINE DEPENDING ON SERVER-SIDE INFORMATION |
| w3. iwa. fxps. co. jp | (1) xyz.abc.def.com NON-ALLOWED<br>(2) aaa.xxx.com NON-ALLOWED<br>(3) ADDRESSES OTHER THAN ABOVE ALLOWED | DETERMINE DEPENDING ON SERVER-SIDE INFORMATION |
| cpf. iwa. fxps. co. jp | (1) *.abc.def.com NON-ALLOWED<br>(2) *.xxx.com NON-ALLOWED<br>(3) ADDRESSES OTHER THAN ABOVE ALLOWED | (a) /containts OR LESS ALLOWED<br>(b) ADDRESSES OTHER THAN ABOVE NON-ALLOWED |
| 1g. cpf. iwa. fxps. co. jp<br>2g. cpf. iwa. fxps. co. jp<br>3g. cpf. iwa. fxps. co. jp | (1) *.cde.def.com ALLOWED<br>(2) ADDRESSES OTHER THAN ABOVE NON-ALLOWED | (a) /containts/aub OR LESS ALLOWED<br>(b) ADDRESSES OTHER THAN ABOVE NON-ALLOWED |
| 13g. cpf. iwa. fxps. co. jp | (1) ok.cde.def.com ALLOWED<br>(2) ADDRESSES OTHER THAN ABOVE NON-ALLOWED | (a) ONLY /index.htm ALLOWED<br>(b) ADDRESSES OTHER THAN ABOVE NON-ALLOWED |
| ADDRESSES OTHER THAN ABOVE | ALL NON-ALLOWED | ALL NON-ALLOWED |

SERVER-LEVEL DATABASE MOUNTED IN FIREWALL

| ALLOWED LEVEL | ALLOWED/NON-ALLOWED ROUTER OR ALLOWED/NON-ALLOWED AREA | PUBLIC/NON-PUBLIC CONTENTS |
|---|---|---|
| 1 | DETERMINE DEPENDING ON SERVER-SIDE INFORMATION | DETERMINE DEPENDING ON SERVER-SIDE INFORMATION |
| 2 | (1) xyz.abc.def.com NON-ALLOWED<br>(2) aaa.xxx.com NON-ALLOWED<br>(3) ADDRESSES OTHER THAN ABOVE ALLOWED | DETERMINE DEPENDING ON SERVER-SIDE INFORMATION |
| 3 | (1) *.abc.def.com NON-ALLOWED<br>(2) *.xxx.com NON-ALLOWED<br>(3) ADDRESSES OTHER THAN ABOVE ALLOWED | (a) /containts OR LESS ALLOWED<br>(b) ADDRESSES OTHER THAN ABOVE NON-ALLOWED |
| 4 | (1) *.cde.def.com ALLOWED<br>(2) ADDRESSES OTHER THAN ABOVE NON-ALLOWED | (a) /containts/aub OR LESS ALLOWED<br>(b) ADDRESSES OTHER THAN ABOVE NON-ALLOWED |
| 5 | (1) ok.cde.def.com ALLOWED<br>(2) ADDRESSES OTHER THAN ABOVE NON-ALLOWED | (a) ONLY /index.htm ALLOWED<br>(b) ADDRESSES OTHER THAN ABOVE NON-ALLOWED |
| 6 | ALL NON-ALLOWED | ALL NON-ALLOWED |

FIG. 18

SERVER DATABASE MOUNTED IN FIREWALL

| REGISTERED SERVER | ALLOWANCE LEVEL OF SERVER CHANGE (RELIABILITY) |
|---|---|
| www. fxpsc. co. jp<br>w3. fxpsc. co. jp | 1 |
| w3. iwa. fxps. co. jp | 2 |
| cpf. iwa. fxps. co. jp | 3 |
| 1g. cpf. iwa. fxps. co. jp<br>2g. cpf. iwa. fxps. co. jp<br>3g. cpf. iwa. fxps. co. jp | 4 |
| 13g. cpf. iwa. fxps. co. jp | 5 |
| ADDRESSES OTHER THAN ABOVE | 6 |

INFORMATION PROCESSING APPARATUS, INFORMATION PROCESSING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2007-241023 filed Sep. 18, 2007.

BACKGROUND

1. Technical Field

The present invention relates to an information processing apparatus, an information processing system, and a computer readable medium.

2. Related Art

Conventionally, in a server system (distributed computer system) in which a server and information processing apparatuses such as personal computers are connected to one another through a network such as a LAN or a WAN, for example, a database system is known in which contents such as documents are stored in the server, and made public so as to be accessible from another information processing apparatus.

In such a database system, access restriction is sometimes requested in order to allow only authorized persons (regular clients or the like) to access the contents such as documents.

SUMMARY

According to an aspect of the present invention, an information processing apparatus includes: a connecting section that is to be connected to an external information processing apparatus; an information storage that stores information; a request accepting section that accepts a predetermined request for the information; a searching section that searches a communication path for the predetermined request between the external information processing apparatus and the present apparatus through the connecting section; a setting information storage that, for each communication path, previously sets allowance/non-allowance of the predetermined request, and that stores information of the setting; a determining section that, in accordance with a result of the communication path search by the searching section, reads out corresponding setting information from the setting information storage, and that determines allowance/non-allowance of the predetermined request; and a process executing section that, in a case where the determining section determines allowance of the predetermined request, executes a process corresponding to the predetermined request, on the information.

BRIEF DESCRIPTION OF THE DRAWINGS

Exemplary embodiment of the present invention will be described in detail based on the following figures, wherein:

FIG. 3 is a view showing a configuration example of a path database;

FIG. 6 is a view showing a configuration example of groups of contents;

FIG. 7 is a view showing a configuration example of the path database;

FIG. 8 is a view showing a configuration example of the path database;

FIG. 9 is a view showing a configuration example of a public reference level database;

FIG. 13 is a view showing a configuration example of the path database;

FIG. 17 is a view diagram showing a configuration example of a server-level database;

FIG. 18 is a view diagram showing a configuration example of a server database.

DETAILED DESCRIPTION

Figure 1:
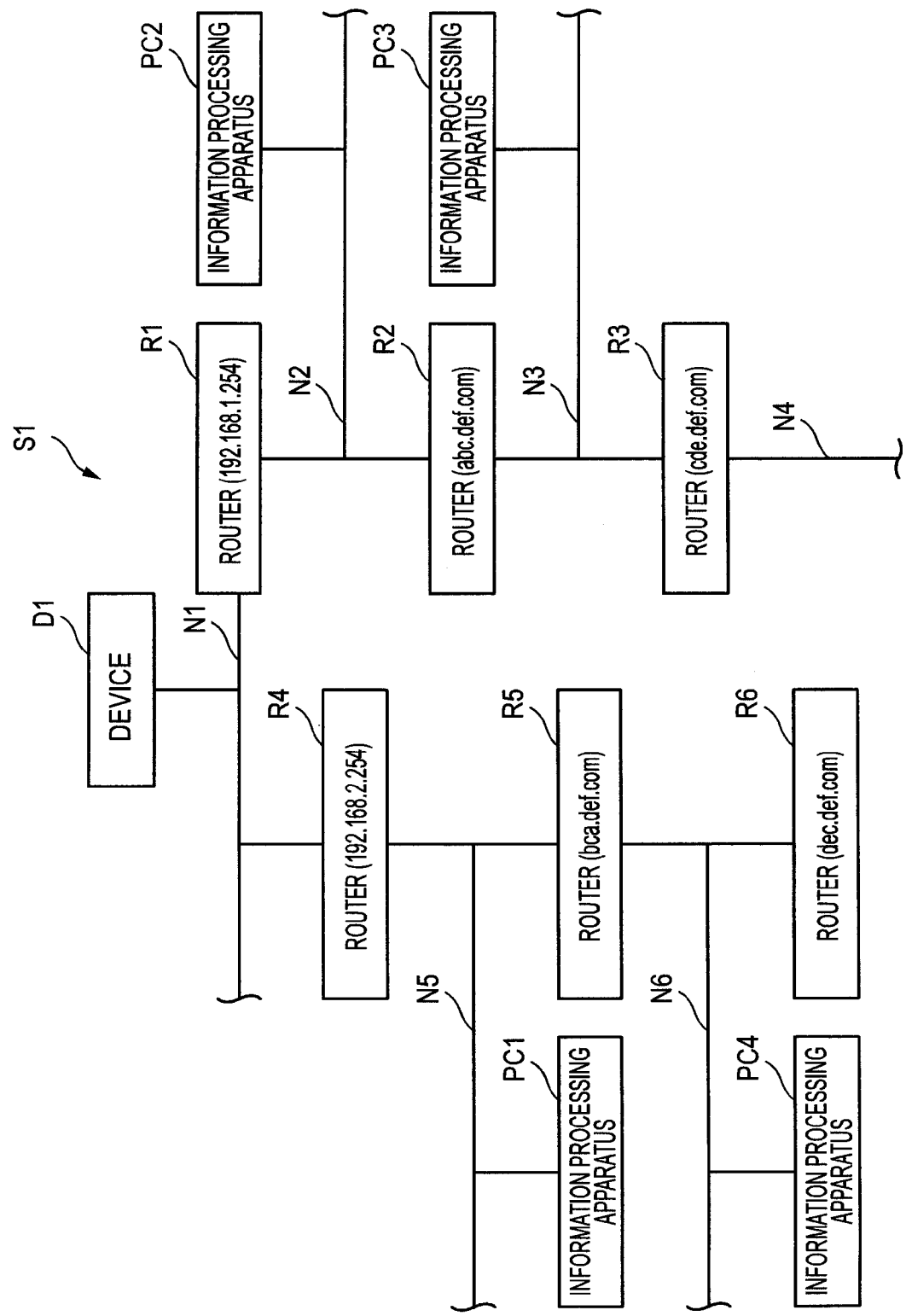
FIG. 1 is a block diagram showing the configuration of an information processing system S1 which is a first exemplary embodiment.

Hereinafter, exemplary embodiments which are examples of the invention will be described in detail with reference to the accompanying drawings. In the drawings, the identical members are designated by the same reference numerals, and duplicated description will be omitted. In the following, the best mode for carrying out the invention will be described, and hence the invention is not restricted to the mode.

First Exemplary Embodiment

Referring to FIGS. 1 to 9, an information processing system S1 which is a first exemplary embodiment of the invention will be described.

As shown in the block diagram of FIG. 1, the information processing system S1 is configured by: a device D1 which is an information processing apparatus (such as a network printer, a scanner, or a multifunction machine) having a network connection function; and information processing apparatuses PC1, PC2, PC3, PC4 such as personal computers, and routers R1, R2, R3, R4, R5, R6 which are connected to one another through networks (connecting section) N1, N2, N3, N4, N5, N6 such as a LAN or a WAN.

The networks N1 to N6 are caused to constitute individual broadcast domains (subnets) by the routers R1 to R6.

The information processing apparatus PC1 is connected to the subnet N5, the information processing apparatus PC2 to the subnet N2, the information processing apparatus PC3 to the subnet N3, and the information processing apparatus PC4 to the subnet N6.

In TCP/IP which is a usual protocol, for example, an IP address which indicates the address of each of the information processing apparatuses PC1 to PC4 is configured by the address (network address) of the subnet N1 to N6 to which the information processing apparatus PC1 to PC4 belongs, and the address (host address) of the information processing apparatus PC1 to PC4 itself in the subnet N1 to N6.

The routers R1 to R6 are respectively provided with individual addresses as described later.

Next, with reference to the block diagram of FIG. 2, the configuration of the device D1 will be described.

Figure 2:
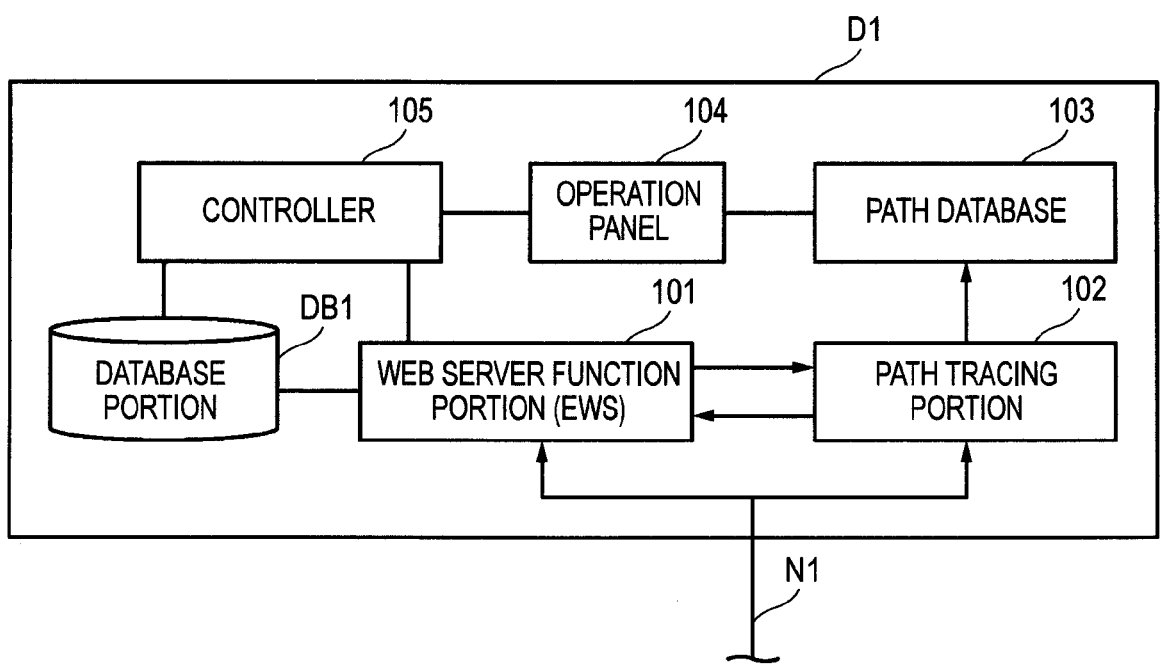
FIG. 2 is a block diagram showing the configuration of a device D1.

In FIG. 2, only the configuration relating to the invention is shown, and configurations relating to the functions (for example, a printer function and a scanner function) of the devices are omitted.

The device D1 is configured by: a database portion (information storing section) DB1 which stores contents such as document data; a web server function portion 101 serving as a request accepting section which accepts a predetermined request (such as a display request or a print request) for the contents (information) of the database portion DB1; a path tracing portion (searching section) 102 which searches a communication path for the predetermined request (i.e., a router through which the request has passed); a path database 103 serving as a setting information storing section which, for each communication path, previously sets allowance/non-allowance of the predetermined request, and which stores information of the setting; an operation panel 104 which is configured by setting buttons for performing the setting, a liquid crystal display panel, and the like; and a controller 105 which is configured by a microcomputer and the like, and which controls various portions.

Although not particularly restricted, the web server function portion 101 can be configured by an embedded web server (hereinafter, abbreviated as EWS).

The term "EWS" means not only a web server mounted in a printer (printing device), but also web servers mounted in various devices. For example, an EWS is sometimes mounted in a home ADSL router which is one kind of the device D1. An EWS can access a web server mounted in an ADSL router from a web browser (web client) mounted in the information processing apparatus PC1 to PC3 serving as a client computer, to set the values of various parameters or display communication history information.

Referring to FIG. 3, an example of the data configuration of the path database 103 will be described.

In the example of FIG. 3, data are set while being divided into following five items A1 to A5; A1: content URL (/a.html, /b.html, . . . , and URLs other than the above); A2: allowed router (a request which passes through the corresponding router is allowed); A3: non-allowed router (a request which passes through the corresponding router is not allowed); A4: operation at non-allowance (no reply or non-allowance reply); and A5: criterion for determining allowance (non-allowance except an allowed router, allowance when a request passes through an allowed router, and the like).

The settings of A1 to A5 above are input by the administrator or the like through the operation panel 104 of the device D1, and stored into the path database 103.

In the example shown in FIG. 3, as seen from that content URLs (/a.html, /b.html, . . . ) are set in A1, contents stored in the database portion DB1 are stored as web pages (HTML files), and operations of browsing, setting, and the like are performed by the web browser of the information processing apparatus which has transmitted the request, through the web server function portion 101.

As shown in FIG. 1, for example, the addresses of the routers are set in the following manner: the router R1: "192.168.1.254"; the router R2: "abc.def.com"; the router R3: "cde.def.com"; the router R4: "192.168.2.254"; the router R5: "bca.def.com"; and the router R6: "dec.def.com".

In the above, "abc.def.com" and the like are notations of addresses in the format of FQDN (Fully Qualified Domain Name).

FQDN is a description format in which all of a domain name, a subdomain name, and a host name are designated without omission on a TCP/IP network such as Internet or an intranet.

According to the setting contents of FIG. 3, in the network configuration of the information processing system S1 shown in FIG. 1, for example, the access request to "/a.html" of the content URL is allowed only when the request passes through the router R1: "192.168.1.254" which is an allowed router (i.e., not allowed when the request passes through a router other than an allowed router). Only when the request is issued from the information processing apparatus PC2 connected to the subnet N2, therefore, an access to the corresponding contents is allowed.

The operation at non-allowance in this case is set to "no reply". When the request is sent from an apparatus other than the information processing apparatus PC2, therefore, a state where no information is replied is made.

The access request to "/b.html" of the content URL is allowed when the request passes through the router R2: "abc.def.com" which is an allowed router (i.e., allowed when the request passes through an allowed router). When the request is issued through the information processing apparatus PC3 connected to the subnet N3, and the subnet N4 (although not shown in FIG. 1, an information processing apparatus can be connected also to the subnet N4), therefore, an access to the corresponding contents is allowed.

The operation at non-allowance in this case is set to "non-allowance reply". When the request passing not through the router R2 is sent, therefore, a process of replaying a message of "Access to contents /b.html is disabled." or the like is performed.

The access request to "/c.html" of the content URL is not allowed when the request passes through the router R4: "192.168.2.254" which is a non-allowed router (i.e., not allowed when the request passes even once through a non-allowed router). In the network configuration of FIG. 1, therefore, a request from the information processing apparatus PC1 or PC4 is not allowed.

With respect to the other content URLs, similarly, allowance/non-allowance is determined in accordance with the preset contents of FIG. 3.

Next, with reference to the flowchart of FIG. 4, the procedure of the request reply process which is executed in the thus configured information processing system S1 will be described.

When the process is started, a request for obtaining contents is accepted in step S100, and the process proceeds to step S101.

In step S101, a dummy reply for waiting a reply such as "In processing, wait for a while." is displayed, and the process proceeds to step S102.

In step S102, a path trace (search for a communication path) is performed by traceroute or the like, and it is determined whether the request is allowed or non-allowed.

Traceroute is a command for checking a path to a specific information processing apparatus on a network and displaying the path together with the time period which has elapsed before connection.

Next, in step S103, it is determined whether the path is the allowed path of the requested contents or not. Specifically, the determination is performed on the basis of the preset contents of the path database of FIG. 3.

If the determination result is "Yes", the process proceeds to step S104 to reply usual contents, and the process is ended.

If "No" in step S103, the process proceeds to step S105, and it is determined whether the non-allowance method is a non-allowance reply or not. If "Yes", the process proceeds to step S106 to reply a message (contents) indicative of non-allowance, such as "Access to the contents is disabled.", and the process is ended.

If "No" is determined in step S105, the process proceeds to step S107, and the process is ended while replying nothing.

As described above, in the exemplary embodiment, allowance/non-allowance of the predetermined request is determined in accordance with the result of the communication path search (trace). Therefore, a situation that predetermined contents are illegally accessed can be prevented from occurring, and it is possible to effectively suppress leakage of information.

Next, with reference to the flowchart of FIG. 5, the procedure of the path determination process which is executed in the thus configured information processing system S1 will be described.

In step S200, the detection of a router on the path is executed, and the process proceeds to step S201.

In step S201, with respect to the requested contents, it is determined whether non-allowance is performed in a router other than an allowed router or not. If "Yes", the process proceeds to step S202, and, if "No", the process proceeds to step S205.

In step S202, it is determined whether the request passes through a router other than an allowed router or not. If "Yes", the process proceeds to step S206 to output a determination result that the request is not allowed, and then the process is ended.

If "No" is determined in step S202, the process proceeds to step S203 to determine whether the request has passed through a non-allowed router or not.

If the determination result is "Yes", the process proceeds to step S206 to output a determination result that the request is not allowed, and then the process is ended.

If the determination result is "No", the process proceeds to step S204 to output a determination result that the request is allowed, and then the process is ended.

When the process proceeds to step S205, it is determined whether the request has passed through an allowed router or not. If "No", the process proceeds to step S206, and, if "Yes", the process proceeds to step S204.

In this way, allowance/non-allowance of the predetermined request is determined in accordance with the result of the router search. Therefore, a situation that predetermined contents are illegally accessed can be prevented from occurring, and it is possible to effectively suppress leakage of information.

Next, with reference to FIGS. 6 and 7, an example in which contents are divided into plural groups will be described.

In an example shown in FIG. 6, plural content URLs are divided into four groups A to D.

Namely, group A is configured by "/a.html", group B by "/b.html" and "/c.html", group C by "/a.html" to "/g.html", and group D by other URLs.

As shown in FIG. 7, then, an allowed router, a non-allowed router, an operation at non-allowance, and a criterion for determining allowance are set for each of the groups A to D.

Therefore, setting for each content can be omitted, and access restriction can be efficiently performed.

Figure 4:
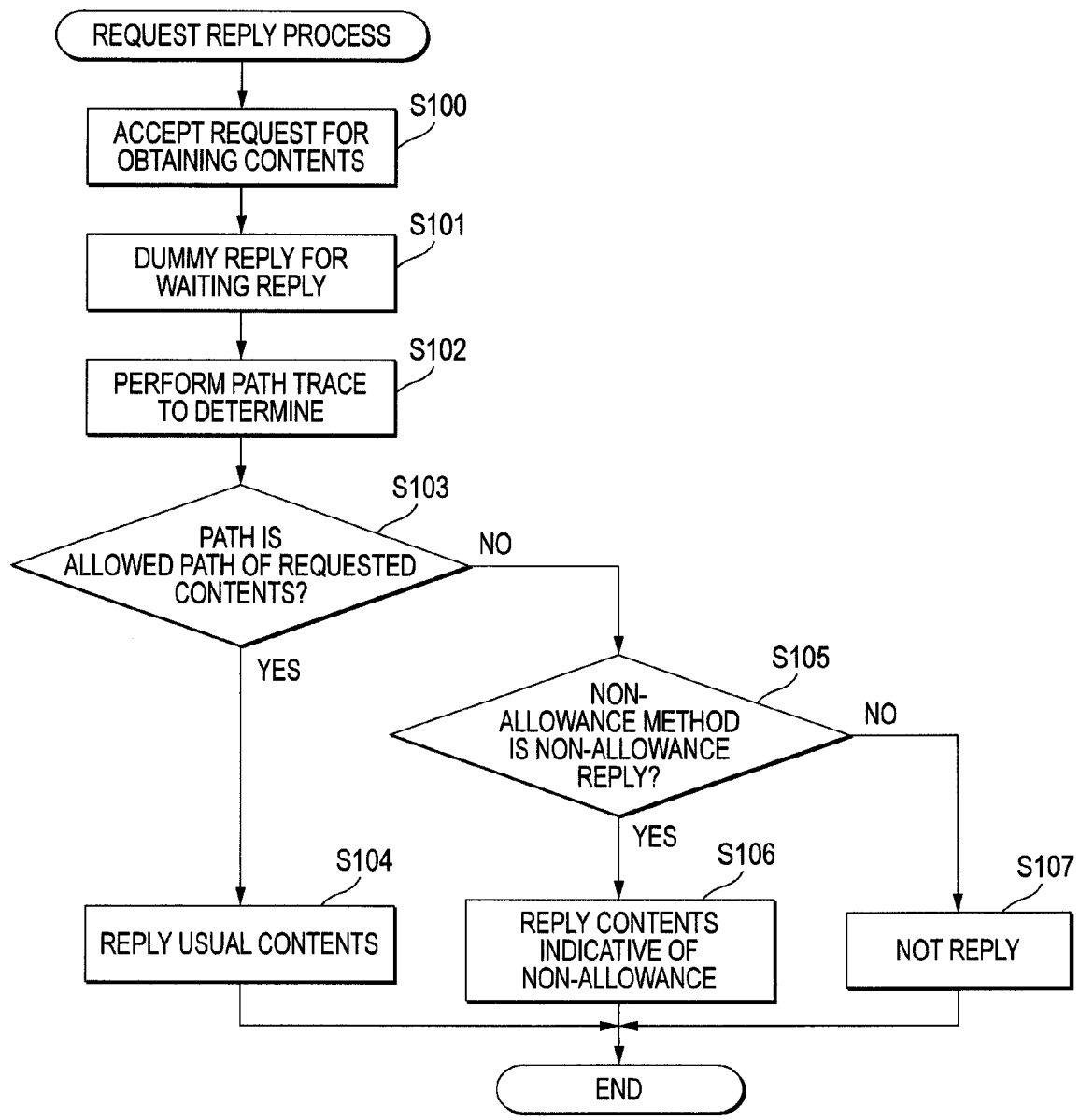
FIG. 4 is a flowchart showing the procedure of a request reply process.
Figure 5:
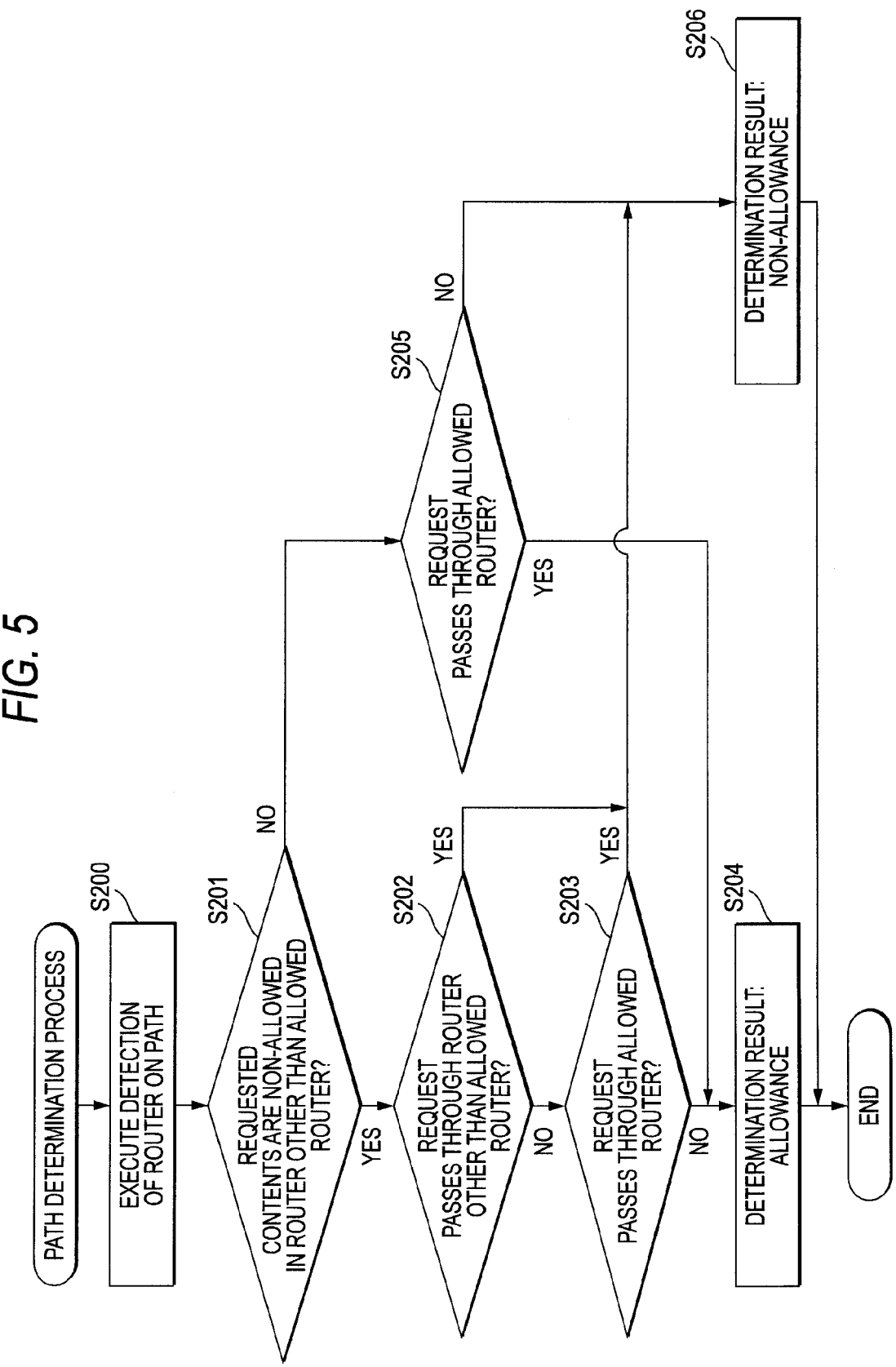
FIG. 5 is a flowchart showing the procedure of a path determination process.

The path determination process shown in the flowcharts of FIGS. 4 and 5 can be similarly performed on the basis of the path database for each group.

Next, with reference to the path database of FIG. 8, an example in which a security level is set in a predetermined path (router) will be described.

In the example shown in FIG. 8, security levels (set values of the path security level) 1 to 4 are set (1 is minimum, and 4 is maximum), security level 1 is set in the router R1: "192.168.1.254" serving as an allowed router, security level 2 is set in the router R2: "abc.def.com" serving as an allowed router, security level 3 is set in the router R4 serving as an non-allowed router, and security level 4 is set in the router R3: "cde.def.com" serving as an non-allowed router.

With reference to a public reference level database of FIG. 9, an example in which a public reference level (set value of the information security level) is set for each content will be described.

In the example shown in FIG. 9, public reference level 1 is set in content URLs "/a.html" and "/b.html", public reference level 2 is set in content URLs "/c.html" and "/d.html", public reference level 3 is set in content URLs "/e.html" to "/g.html", and public reference level 4 is set in the other content URLs.

A threshold to be compared with the security level, and that to be compared with the public reference level are preset.

For example, the path tracing section 102 detects the routers R1 to R6 on the path by means of above-described traceroute, and at the same time determines the public reference level of the requested content while referring to the public reference level database of FIG. 9. Namely, the preset threshold is compared with the public reference level.

In the case where the threshold of the public reference level is set to "2", for example, only contents of public reference level 1 are made public, and contents of public reference levels 2 to 4 are made non-public. Therefore, the security can be improved.

Next, with reference to the path database of FIG. 8, the security level of the detected route is compared with the threshold, and publication/non-publication of contents can be determined.

Therefore, request restriction according to the importance of information (contents), the reliability of the communication path, or the like can be performed, and it is possible to effectively suppress leakage of information (contents) and the like.

Second Exemplary Embodiment

Referring to FIGS. 10 to 15, an information processing system S2 which is a second exemplary embodiment of the invention will be described.

Figure 10:
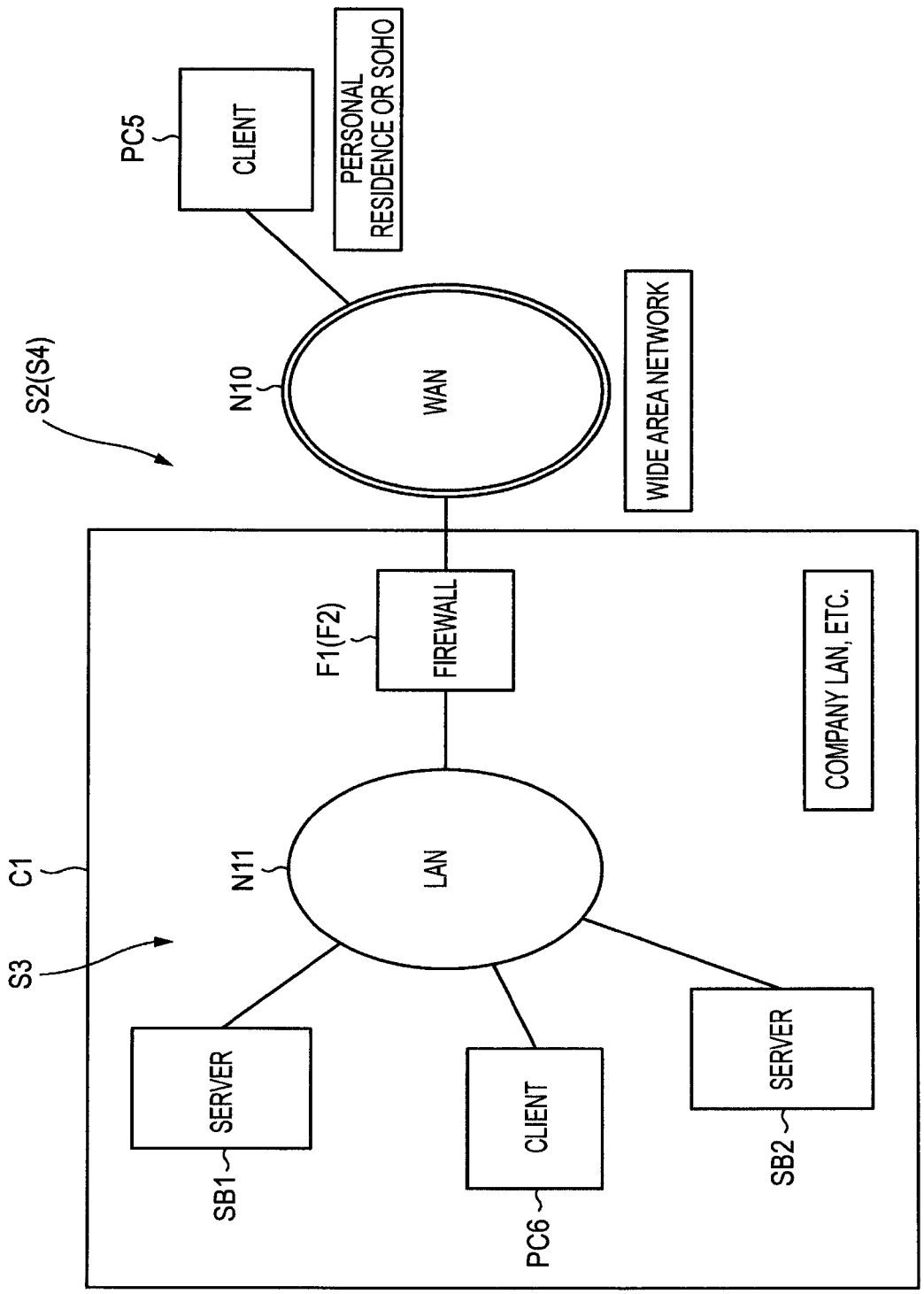
FIG. 10 is a block diagram showing the configuration of an information processing system S2 which is a second exemplary embodiment.

As shown in FIG. 10, the information processing system S2 is configured by: an information processing apparatus PC5 serving as a client (in a personal residence or a SOHO) configured by a personal computer or the like which is connected through a network N10 such as a WAN (Wide Area Network); and a server system S3 connected to the network N10 through a network N11 which is configured by a LAN or the like in a company such as an office C1.

The server system S3 is configured by: a firewall F1 which is interposed between the network (WAN) N10 and a network (LAN) N11; servers SB1, SB2 which are connected to the network N11; and an information processing apparatus PC6 serving as a client configured by a personal computer or the like.

The connection numbers of the servers and the information processing apparatuses are not restricted to those of the example of FIG. 10, and are arbitrarily set.

Usually, a firewall is a system which prevents a computer network in an organization from being invaded from the outside, or an information processing apparatus into which such a system is incorporated.

In a network in a company or the like, in order to prevent a third party from invading the network through an external network such as Internet to perform illegal activities such as peeping, falsification, and breaking of data or programs, data flowing through an interface with the outside must be monitored, and an unauthorized access must be detected and interrupted. A system which realizes these functions is a firewall.

In many cases, a firewall is provided in the form of software, and is used while being installed on an information processing apparatus. In the case where a higher performance is required, dedicated hardware is sometimes used.

There are various types of firewalls. In the packet filtering type or the circuit-level gateway type, for example, a firewall is often incorporated as a partial function of a hardware apparatus such as a layer 3 switch (router) or a layer 4 switch. In this case, a packet inspection is enabled only under somewhat simple conditions. Therefore, such a firewall is sometimes called a simple firewall or a broad firewall.

In the exemplary embodiment, the firewall F1 functions also as the router in the first exemplary embodiment. Therefore, it can be the that the firewall is a firewall of the above-described packet filtering type or circuit-level gateway type which is configured by hardware.

Referring to the block diagram of FIG. 11, the configuration of the firewall F1 will be described.

Figure 11:
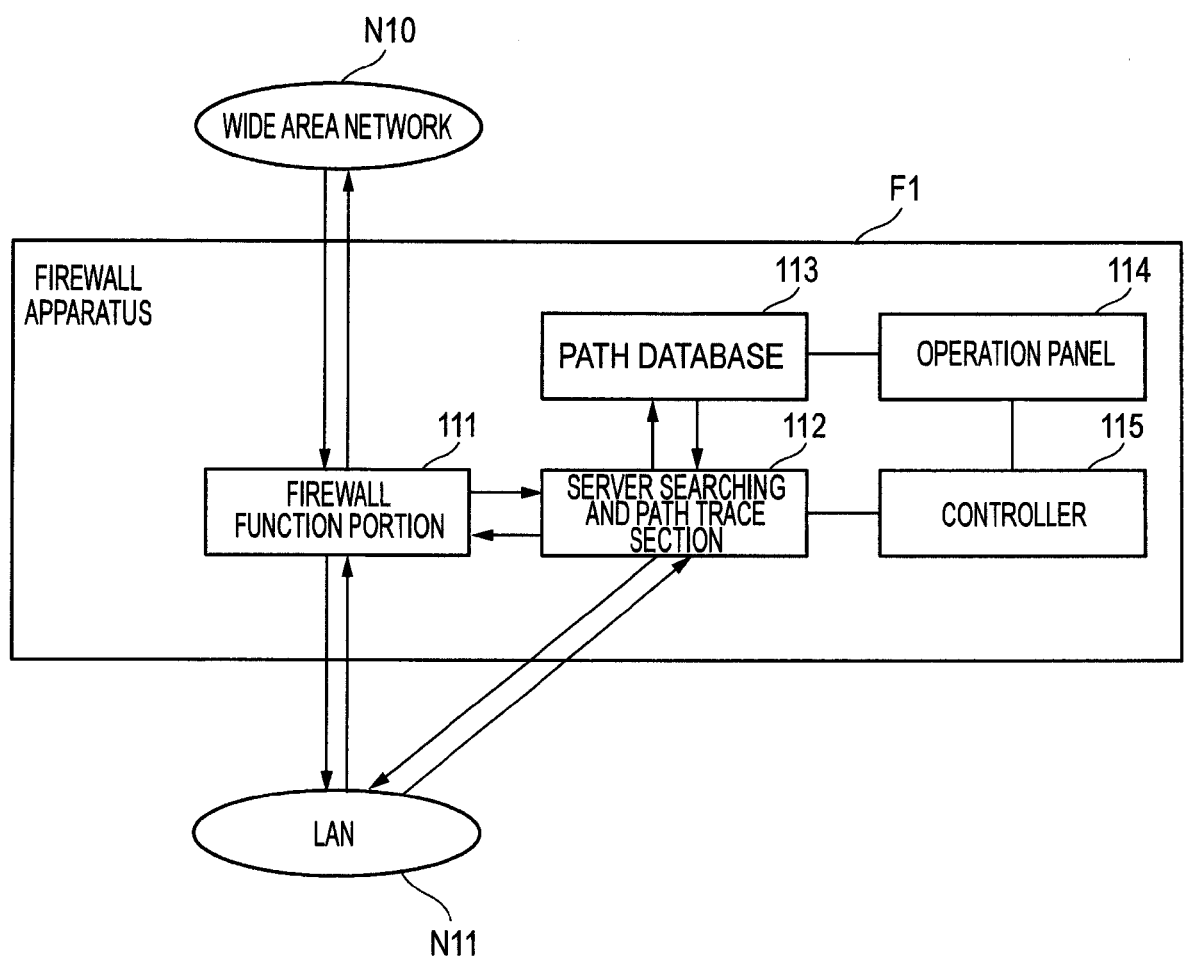
FIG. 11 is a block diagram showing the configuration of a firewall F1.

As shown in FIG. 11, the firewall F1 is configured by: a firewall function portion 111 which monitors a data flow and detects and interrupts an unauthorized access as described above; a server search and path trace section 112 which searches a server and a communication path; a path database 113 serving as a setting information storing section which, for each communication path, previously sets allowance/non-allowance of the predetermined request, and which stores information of the setting; an operation panel 114 which is configured by setting buttons for performing the setting, a liquid crystal display panel, and the like; and a controller 115 which is configured by a CPU and the like, and which controls various portions.

Next, with reference to the block diagram of FIG. 12, the configuration of the server SB1 will be described. In the exemplary embodiment, it is assumed that also the server SB and other servers which can be connected to the network N11 have a equivalent configuration.

Figure 12:
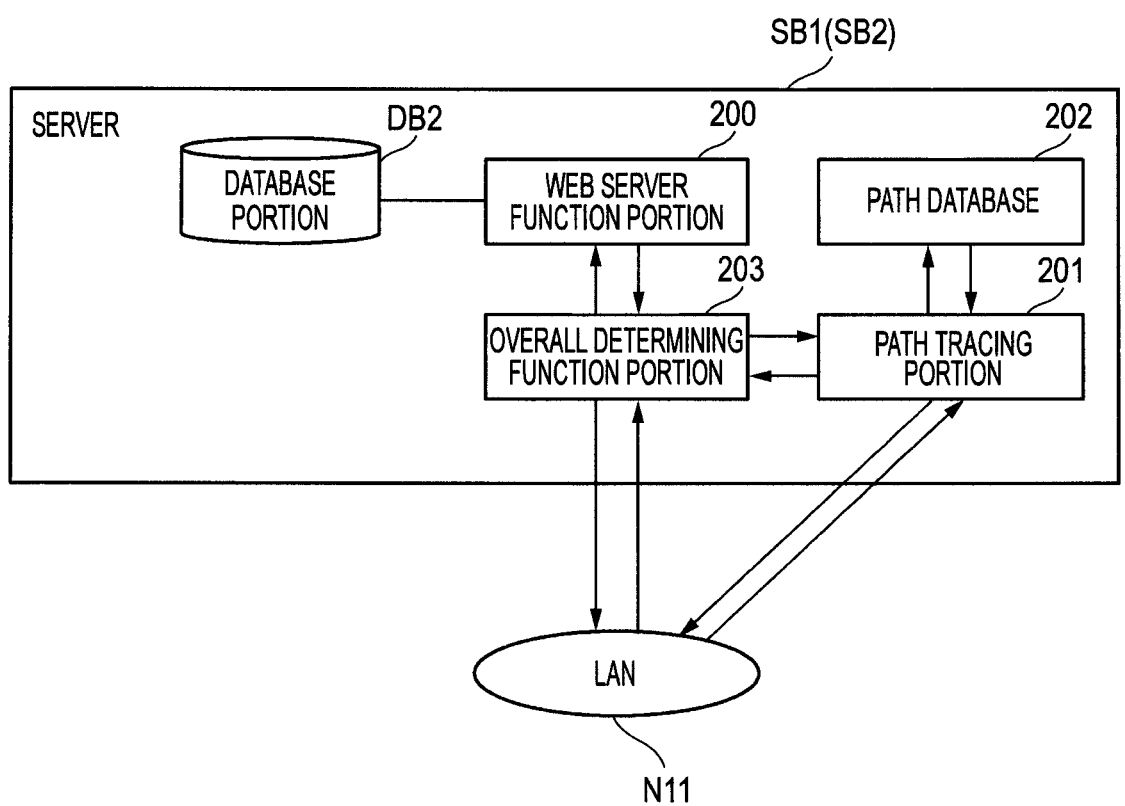
FIG. 12 is a block diagram showing the configuration of a server SB1.

As shown in FIG. 12, the server SB1 is configured by: a database portion (information storing section) DB2 which stores contents such as document data; a web server function portion 200 serving as a request accepting section which accepts a predetermined request (such as a display request and a print request) for the contents (information) of the database portion DB2; a path tracing portion (searching section) 201 which searches a communication path for the predetermined request (i.e., a router through which the request has passed); a path database 202 serving as a setting information storing section which, for each communication path, previously sets allowance/non-allowance of the predetermined request, and which stores information of the setting; and an overall determining function portion 203 which determines allowance/non-allowance of a request on the basis of the preset value of the path database 202 and a result of the path search of the path tracing section 201.

The contents stored in the database portion (information storing section) DB2, and the information stored in the path database 202 can be made different for each server.

Next, with reference to FIG. 13, a configuration example of the path database 113 of the firewall F1 will be described.

In the example shown in FIG. 13, three items are set: item A10 indicating the address of a server; item A11 indicating an allowed/non-allowed router or an allowed/non-allowed area; and item A12 indicating public/non-public contents.

With respect to server: "www.fxpsc.co.jp (w3.fxpsc.co.jp)", for example, the allowed/non-allowed router or an allowed/non-allowed area and the public/non-public content are set to be determined depending on server-side information (information of the path database 202).

With respect to server: "cpf.iwa.fxps.co.jp", for example, the allowed/non-allowed router or an allowed/non-allowed area is set in the following manner: (1) *.abc.def.com non-allowed; (2) *.xxx.com non-allowed; and (3) addresses other than the above allowed, and the public/non-public content is set in the following manner: (a) /containts or less allowed; and (b) addresses other than the above non-allowed.

With respect to servers: "1g.cpf.iwa.fxps.co.jp", "2g.cpf.iwa.fxps.co.jp", and "3g.cpf.iwa.fxps.co.jp", for example, the allowed/non-allowed router or an allowed/non-allowed area is set in the following manner: (1) *.cde.def.com allowed; and (2) addresses other than the above non-allowed, and the public/non-public content is set in the following manner: (a) /containts/sub or less allowed; and (b) addresses other than the above non-allowed.

FIG. 13 shows an example. The contents of allowance/non-allowance can be arbitrarily set by the administrator or the user.

In FIG. 13, the addresses of the routers and the servers are expressed in the FQDN notation, but alternatively may be described by an IP address.

In FIG. 13, servers "other than the above" are set to "all are non-allowed". Alternatively, the setting may be performed so that allowing conditions are added.

With respect to server: "13g.cpf.iwa.fxps.co.jp", for example, the allowed/non-allowed router or an allowed/non-allowed area is set in the following manner: (1) ok.cde.def.com allowed; and (2) addresses other than the above non-allowed.

With respect to servers other than the above, all of the allowed/non-allowed router or an allowed/non-allowed area and the public/non-public content are set to be non-allowed.

Figure 14:
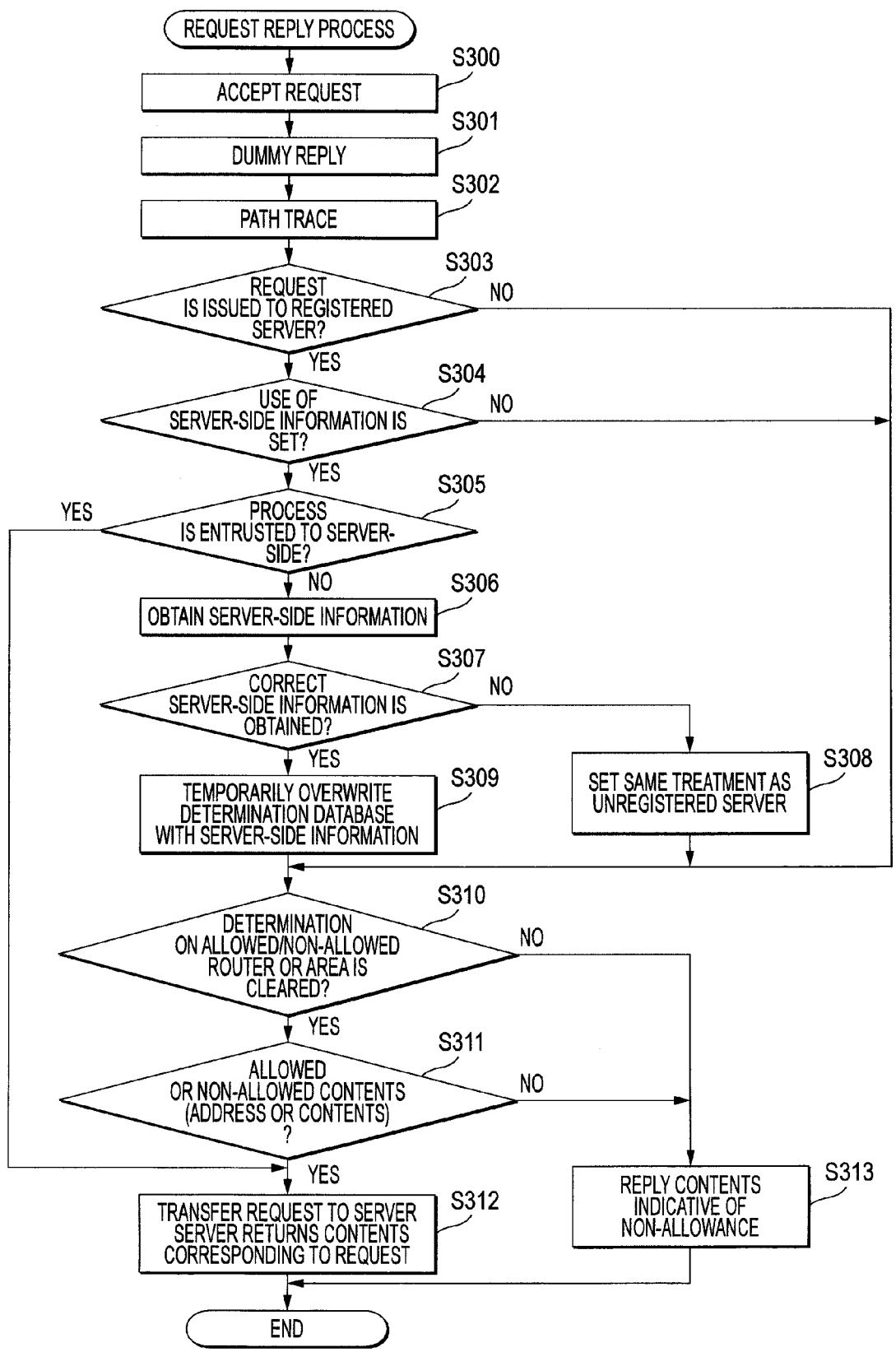
FIG. 14 is a flowchart showing the procedure of the request reply process.

Next, with reference to the flowchart of FIG. 14, the procedure of the request reply process which is executed in the firewall F1 of the thus configured information processing system S2 will be described.

When the process is started, a request for obtaining contents is accepted in step S300 from, for example, the information processing apparatus PC5, and the process proceeds to step S301.

In step S301, a dummy reply for waiting a reply such as "In processing, wait for a while." is displayed, and the process proceeds to step S302.

In step S302, a path trace (search for a communication path) is performed by traceroute or the like, and it is determined whether the request is allowed or non-allowed.

Traceroute is a command for checking a path to a specific information processing apparatus on a network and displaying the path together with the time period which has elapsed before connection.

Next, in step S303, it is determined whether the request is issued to a registered server or not. If "No", the process proceeds to step S310, and, if "Yes", the process proceeds to step S304.

In step S304, it is determined whether the server-side information is used or not. As described above, the server-side information indicates the path database 202 provided in the server SB1 or the like.

If "No" in step S304, the process proceeds to step S310, and, if "Yes", the process proceeds to step S305.

In step S305, it is determined whether the process is entrusted to the server-side or not. If "Yes", the process proceeds to step S312 to transfer the request to the server, and the server sends contents corresponding to the request, to the information processing apparatus PC5 or the like. Thereafter, the process is ended.

If "No" is determined in step S305, the process proceeds to step S306 to obtain the server-side information, and then proceeds to step S307 to determine whether correct server-side information is obtained or not.

If "No", the process proceeds to step S308 to set the same treatment as an unregistered server, and then proceeds to step S310.

If "Yes", the process proceeds to step S309 to temporarily overwrite a determination database with server-side, and then proceeds to step S310.

In step S310, it is determined whether the determination on an allowed/non-allowed router or area is cleared or not. If "No", the process proceeds to step S313 to perform a reply indicating that the request is non-allowed, and the process is then ended.

If "Yes", the process proceeds to step S311 to determine whether the contents are allowed or non-allowed contents (address or contents). If "No", the process proceeds to step S313 to perform a reply indicating that the request is non-allowed, and the process is then ended. If "Yes", the process proceeds to step S312 to transfer the request to the server, and the server sends contents corresponding to the request, to the information processing apparatus PC5 or the like. Thereafter, the process is ended.

According to the configuration, access restriction is adequately performed in accordance with contents and the setting of the communication path, and the security can be improved.

Figure 15:
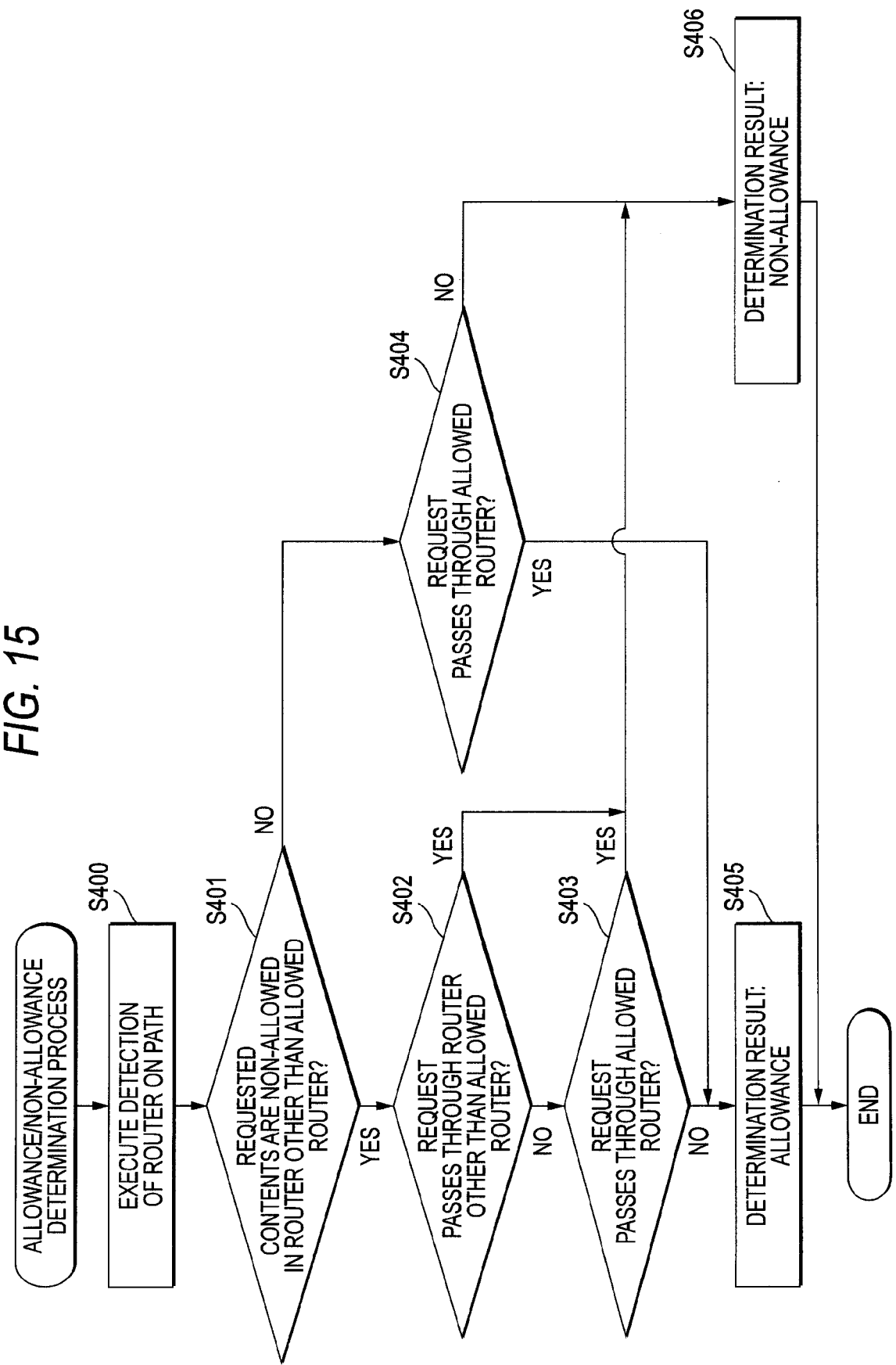
FIG. 15 is a flowchart showing the procedure of the path determination process.

Next, with reference to the flowchart of FIG. 15, the procedure of the path determination process which is executed in the thus configured information processing system S2 will be described.

In step S400, the detection of a router on the path is executed, and the process proceeds to step S401.

In step S401, with respect to the requested contents, it is determined whether non-allowance is performed in a router other than an allowed router or not. If "Yes", the process proceeds to step S402, and, if "No", the process proceeds to step S404.

In step S402, it is determined whether the request has passed through a router other than a non-allowed router or not. If "Yes", the process proceeds to step S406 to output a determination result that the request is not allowed, and then the process is ended.

If "No" is determined in step S402, the process proceeds to step S403 to determine whether the request has passed through a non-allowed router or not.

If the determination result is "Yes", the process proceeds to step S406 to output a determination result that the request is not allowed, and then the process is ended.

If the determination result is "No", the process proceeds to step S405 to output a determination result that the request is allowed, and then the process is ended.

When the process proceeds to step S404, it is determined whether the request passes through an allowed router or not.

If "No", the process proceeds to step S406, and, if "Yes", the process proceeds to step S405.

In this way, allowance/non-allowance of the predetermined request is determined in accordance with the result of the router search. Therefore, a situation that predetermined contents are illegally accessed can be prevented from occurring, and it is possible to effectively suppress leakage of information.

Third Exemplary Embodiment

Next, referring to FIGS. 16 to 19, an information processing system S4 which is a third exemplary embodiment of the invention will be described.

The configuration of the information processing apparatus S4 is substantially identical with that of the information processing apparatus S2 of the second exemplary embodiment shown in FIG. 10.

Figure 16:
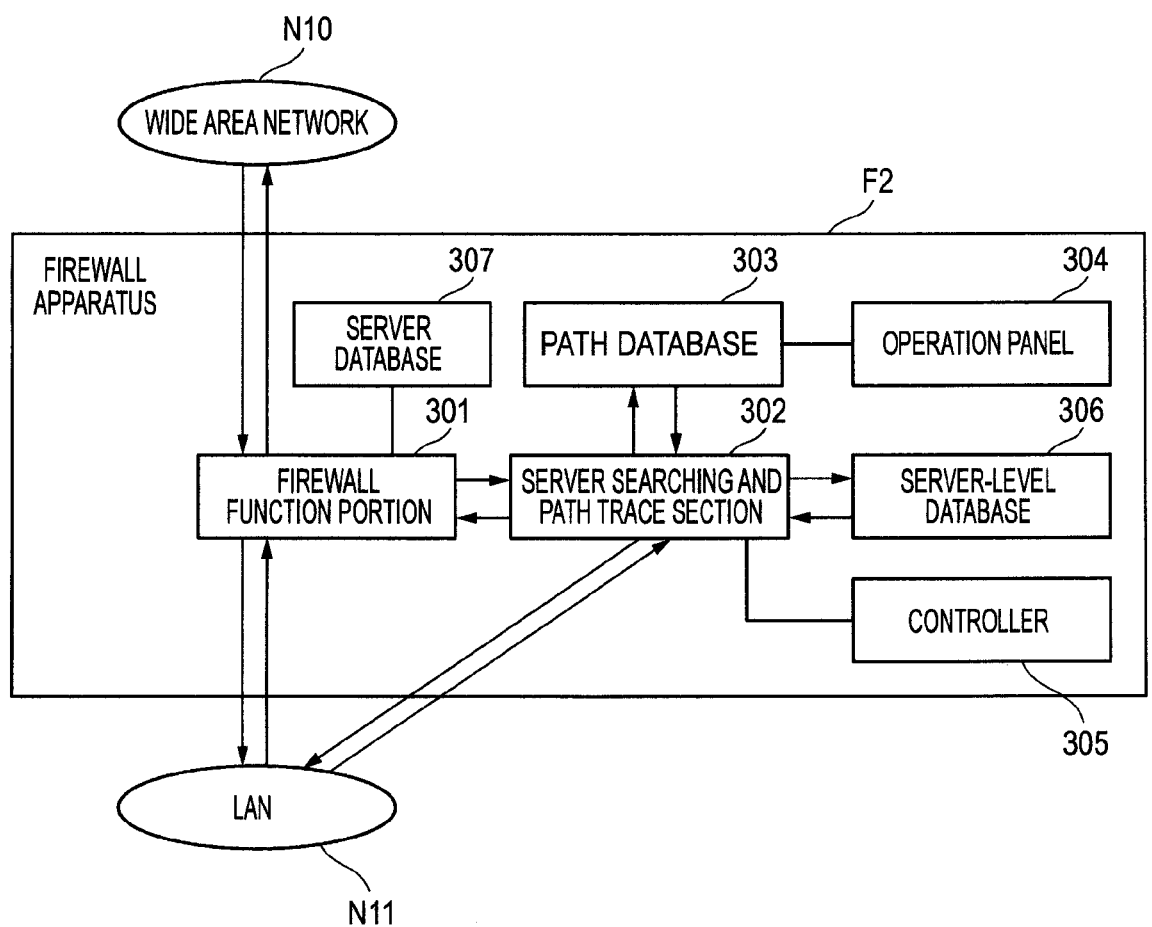
FIG. 16 is a block diagram showing the configuration of a firewall F2.

In the exemplary embodiment, as shown in the block diagram of FIG. 16, the configuration of a firewall F2 is different from that of the above-described firewall F1.

The firewall F2 is configured by: a firewall function portion 301 which monitors a data flow and detects and interrupts an unauthorized access; a server search and path trace section 302 which searches a server and a communication path; a path database 303 serving as a setting information storing section which, for each communication path, previously sets allowance/non-allowance of the predetermined request, and which stores information of the setting; an operation panel 304 which is configured by setting buttons for performing the setting, a liquid crystal display panel, and the like; a controller 305 which is configured by a CPU and the like, and which controls various portions; a server-level database 306 which sets the level of each server (sets the path security level or the information security level), and which stores the settings; and a server database 307 which stores information of registered servers.

FIG. 17 shows a configuration example of the server-level database 306 of the firewall F2.

In the example, six levels 1 to 6 of security are set as allowance levels.

FIG. 17 shows an example. The contents of allowance/non-allowance according to the level can be arbitrarily set by the administrator or the user.

In the example of FIG. 17, the addresses of the routers are expressed in the FQDN notation, but alternatively may be described by an IP address.

In the example of FIG. 17, servers "other than the above" are set to "all are non-allowed". Alternatively, the setting may be performed so that allowing conditions are added.

In the example of FIG. 17, a smaller level numeral indicates a higher allowance level. However, higher and lower levels are deemed to be conceptual. Depending on operations, a level numeral may be assumed as a mere selection number of the allowance/non-allowance database.

FIG. 18 shows a configuration example of the server database 307 of the firewall F2.

In the example shown in FIG. 18, the addresses of registered servers, and preset values of the allowance levels (reliability or security level: six levels 1 to 6) which are used in changing a server are stored.

Figure 19:
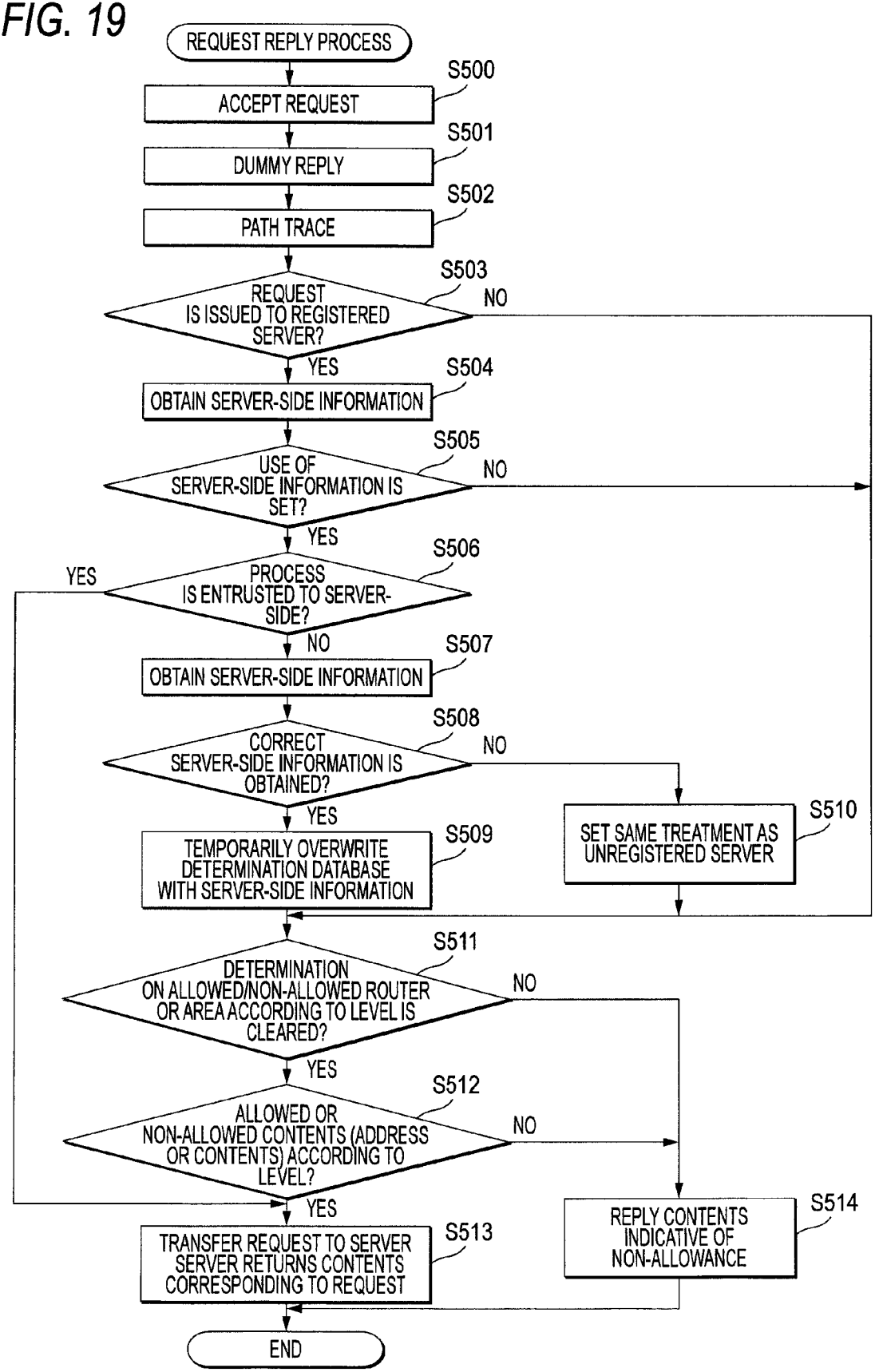
FIG. 19 is a flowchart showing the procedure of the request reply process.

Next, with reference to the flowchart of FIG. 19, the procedure of the request reply process which is executed in the thus configured firewall F2 will be described.

When the process is started, a request for obtaining contents is accepted in step S500 from, for example, the information processing apparatus PC5, and the process proceeds to step S501.

In step S501, a dummy reply for waiting a reply such as "In processing, wait for a while." is displayed, and the process proceeds to step S502.

In step S502, a path trace (search for a communication path) is performed by traceroute or the like, and it is determined whether the request is allowed or non-allowed.

Traceroute is a command for checking a path to a specific information processing apparatus on a network and displaying the path together with the time period which has elapsed before connection.

Next, in step S503, it is determined whether the request is issued to a registered server or not. If "No", the process proceeds to step S511, and, if "Yes", the process proceeds to step S504.

In step S504, the allowance level of a server which is searched from the server database 307, and the process proceeds to step S505.

In step S505, it is determined whether the server-side information is used or not. As described above, the server-side information indicates the path database 303 provided in the firewall F2 or the like.

If "No" in step S505, the process proceeds to step S511, and, if "Yes", the process proceeds to step S506.

In step S506, it is determined whether the process is entrusted to the server-side or not. If "Yes", the process proceeds to step S513 to transfer the request to the server, and the server sends contents corresponding to the request, to the information processing apparatus PC5 or the like. Thereafter, the process is ended.

If "No" is determined in step S506, the process proceeds to step S507 to obtain the server-side information, and then proceeds to step S508 to determine whether correct server-side information is obtained or not.

If "No", the process proceeds to step S510 to set the same treatment as an unregistered server, and then proceeds to step S511.

If "Yes", the process proceeds to step S509 to temporarily overwrite a determination database with server-side, and then proceeds to step S511.

In step S511, it is determined whether the determination on an allowed/non-allowed router or area is cleared or not. If "No", the process proceeds to step S514 to perform a reply indicating that the request is non-allowed, and the process is then ended.

If "Yes", the process proceeds to step S512 to determine whether the contents are allowed or non-allowed contents (address or contents). If "No", the process proceeds to step S514 to perform a reply indicating that the request is non-allowed, and the process is then ended. If "Yes", the process proceeds to step S513 to transfer the request to the server, and the server sends contents corresponding to the request, to the information processing apparatus PC5 or the like. Thereafter, the process is ended.

According to the configuration, access restriction is adequately performed in accordance with contents and the setting of the communication path, and the security can be improved.

Although the invention conducted by the inventor has been specifically described on the basis of the exemplary embodiments, the exemplary embodiments disclosed in the specification are exemplarily shown in all aspects, and it is to be understood that the invention is not restricted to the disclosed techniques. Namely, the technical scope of the invention should not be restrictively interpreted on the basis of the description of the exemplary embodiments, and should be interpreted in accordance with the description of the appended claims. The invention includes techniques equivalent to those set forth in the claims, and all changes within the scopes of the claims.

In the case where programs are used, they can be provided through a network, or in the form that they are stored in a recording medium such as a CD-ROM.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
a connecting section that is to be connected to an external information processing apparatus;
an information storage that stores information;
a request accepting section that accepts a predetermined request for the information;
a searching section that searches for routers in a communication route of the predetermined request between the external information processing apparatus and the information processing apparatus through the connecting section;
a router security level setting section which sets a security level among a plurality of security levels that are used as criteria for determining whether the information is to be made public, for each of the routers in the communication route;
a router security level storage that stores the security levels of the routers in the communication route that are set by the route security level setting section, while being correlated to the information;
a determining section that, in accordance with a result of the communication route search by the searching section, reads out a security level for each of the routers in the communication route, from the router security level storage, compares the security levels with a preset threshold, determines allowance of the predetermined request if the security levels of all of the routers in the communication route meet the preset threshold, and determines non-allowance of the predetermined request if the security levels of any of the routers in the communication route do not meet the preset threshold; and
a process executing section that, in response to the determining section determining allowance of the predetermined request, executes a process corresponding to the predetermined request, on the information, and in response to the determining section determining non-allowance of the predetermined request, does not execute the predetermined request.

2. The information processing apparatus as claimed in claim 1, wherein the searching section searches for the routers in the communication route through which the request passes, the routers being interposed between the external information processing apparatus and the information processing apparatus.

3. The information processing apparatus as claimed in claim 1, wherein the searching section searches for a firewall in the communication route through which the request passes, the firewall being interposed between the external information processing apparatus and the information processing apparatus.

4. The information processing apparatus as claimed in claim 1, further comprising:
a process setting section that previously sets information relating to a process to be performed in the case where the predetermined request is not allowed,
wherein in a case where the determining section determines non-allowance of the predetermined request, a process according to the setting of the process setting section is performed.

5. An information processing system comprising:
at least one of information processing apparatuses as claimed in claim 1; and
at least one of other information processing apparatuses which are connected to the information processing apparatuses through a predetermined communication section.

6. The information processing system as claimed in claim 5, wherein at least one of the information processing apparatuses or the other information processing apparatuses is configured by a server.

7. The information processing system as claimed in claim 5, wherein at least one of the information processing apparatuses or the other information processing apparatuses is configured by a firewall.

8. The information processing apparatus as claimed in claim 1, further comprising:
an information security level setting section that sets a security level among a plurality of security levels that are used as criteria for determining whether each of the information is to be made public; and
an information security level storage that stores the security levels that are set by the information security level setting section, while being correlated to the information,
wherein the determining section reads out a security level for each of the information, from the information security level storage, and compares the security level with a preset threshold to determine allowance/non-allowance of the predetermined request.

9. The information processing apparatus as claimed in claim 8, wherein the information storage stores the information with divided into a plurality of groups, and
the information security level setting section sets a security level that is used as a criterion for determining whether the information is to be made public, for each group.

10. The information processing apparatus as claimed in claim 1, further comprising:
an information security level setting section that sets a security level of the information from among a plurality of security levels,
wherein the determining section, in accordance with a result of the communication route search by the searching section, determines whether to grant the external information processing apparatus access to the information based on whether the security levels of the routers are equal to or greater than the security level of the information.

11. A non-transitory computer readable medium storing a program causing a computer to execute a process for restricting a request for information, the process comprising:
connecting to an external information processing apparatus;
storing the information;
accepting a predetermined request for the information;
searching for routers in a communication route of the predetermined request between two or more information processing apparatuses which are connected to each other;
setting a security level among a plurality of security levels that are used as criteria for determining whether the information is to be made public, for each of the routers in the communication route;
storing the security levels of the routers in the communication route, while being correlated to the information;
in accordance with a result of the communication route searched in the searching of the communication route, reading out the security level for each of the routers in the communication route, comparing the security levels with a preset threshold, determining allowance of the predetermined request if the security levels of all of the routers in the communication route meet the preset threshold based on a result of the comparing, and determining non-allowance of the predetermined request if the security levels of any of the routers in the communication route do not meet the preset threshold; and
in response to determining allowance of the predetermined request, executing a process corresponding to the predetermined request, on the information, and in response to determining non-allowance of the predetermined request, withholding execution of the predetermined request.

12. The non-transitory computer readable medium as claimed in claim 11, wherein the searching of the communication route searches for the routers in the communication route through which the request passes, the routers being interposed between the two or more information processing apparatuses that are connected to each other.

13. The non-transitory computer readable medium as claimed in claim 11, wherein the searching of the communication route searches for a firewall in the communication route through which the request passes, the firewall being interposed between the two or more information processing apparatuses that are connected to each other.

14. The non-transitory computer readable medium as claimed in claim 11, further comprising:
previously setting information relating to a process to be performed in the case where the predetermined request is not allowed, and
in a case where non-allowance of the predetermined request is determined, a process according to a setting in the setting of the information is performed.

15. The non-transitory computer readable medium as claimed in claim 11, further comprising:
setting security level among a plurality of security levels that are used as criteria for determining whether each of the information is to be made public; and
storing the security levels that are set in the setting of the plurality of security levels, while being correlated to the information,
wherein the determining of the allowance/non-allowance reads out a security level for each of the information, and compares the set value with a preset threshold to determine allowance/non-allowance of the predetermined request.

16. The non-transitory computer readable medium as claimed in claim 15, wherein the storing of the information stores the information with divided into a plurality of groups, and the setting of the plurality of security levels sets a security level that is used as a criterion for determining whether the information is to be made public, for each group.

* * * * *